(12) United States Patent
Kajita et al.

(10) Patent No.: US 7,745,050 B2
(45) Date of Patent: Jun. 29, 2010

(54) SEPARATOR AND NON-AQUEOUS ELECTROLYTE BATTERY

(75) Inventors: Atsushi Kajita, Fukushima (JP); Hiroyuki Suzuki, Fukushima (JP); Hiroyuki Akashi, Kanagawa (JP); Kenichi Ogawa, Fukushima (JP)

(73) Assignee: Sony Corporation, Tokyo (JP)

( * ) Notice: Subject to any disclaimer, the term of this patent is extended or adjusted under 35 U.S.C. 154(b) by 216 days.

(21) Appl. No.: 11/622,886

(22) Filed: Jan. 12, 2007

(65) Prior Publication Data

US 2007/0178384 A1    Aug. 2, 2007

(30) Foreign Application Priority Data

Jan. 13, 2006    (JP)    ............................. 2006-006254

(51) Int. Cl.
*H01M 2/16* (2006.01)

(52) U.S. Cl. ........................ 429/251; 429/254; 429/246; 429/129

(58) Field of Classification Search .................. 429/251, 429/254, 246, 129
See application file for complete search history.

(56) References Cited

U.S. PATENT DOCUMENTS

| | | |
|---|---|---|
| 7,189,478 B2 * | 3/2007 | Iijima et al. .................. 429/246 |
| 2005/0266150 A1 * | 12/2005 | Yong et al. .................. 429/209 |
| 2007/0122716 A1 * | 5/2007 | Seo et al. ..................... 429/251 |

FOREIGN PATENT DOCUMENTS

| | | | |
|---|---|---|---|
| JP | 2004-288586 | * | 10/2004 |
| WO | WO 03/019713 | | 3/2003 |

* cited by examiner

*Primary Examiner*—Laura S Weiner
(74) *Attorney, Agent, or Firm*—K&L Gates LLP

(57) ABSTRACT

A separator having a structure in which a resin layer is formed at least on one principal plane of a base material layer, wherein the resin layer has an inorganic substance is provided. A non-aqueous electrolyte battery in which a cathode and an anode are arranged through the separator so as to face each other is also provided.

6 Claims, 6 Drawing Sheets

Fig. 6 il
SEPARATOR AND NON-AQUEOUS ELECTROLYTE BATTERY

CROSS REFERENCES TO RELATED APPLICATIONS

The present invention contains subject matter related to Japanese Patent Application JP 2006-006254 filed in the Japanese Patent Office on Jan. 13, 2006, the entire contents of which is being incorporated herein by reference.

BACKGROUND

The present disclosure relates to a separator and a non-aqueous electrolyte battery and, more particularly, to a microporous separator and a non-aqueous electrolyte battery having a cathode, an anode, a non-aqueous electrolyte, and the separator.

Owing to the remarkable development of a recent portable electronic apparatus technique, cellular phones and notebook-sized computers are appreciated as a basic technique which supports an advanced information society. Studies and development regarding a technique for realizing advanced functions of those apparatuses are vigorously being progressed. There is such a problem that a driving time is reduced by an increase in electric power consumption due to the advanced functions.

To assure the driving time of a predetermined level or longer, it is indispensable to realize a high energy density of a secondary battery which is used as a driving power source. Therefore, in a secondary battery having an advanced function represented by, for example, a lithium ion secondary battery or the like, it is expected to accomplish the higher energy density.

In the lithium ion secondary battery in the related art, lithium cobalt acid is used for a cathode, a carbon material is used for an anode, and an operating voltage is set to a value within a range from 2.5 to 4.2 V. In a single battery, a terminal voltage can be raised to 4.2V owing to an excellent electrochemical stability of a non-aqueous electrolyte material, the separator, and the like.

On the other hand, a cathode active material such as lithium cobalt acid or the like which is used in the lithium ion secondary battery in the related art which operates at the maximum voltage of 4.2V merely uses a capacitance of about 60% of its theoretical capacitance and a residual capacitance can be utilized in principle by further raising a charge voltage. As disclosed in International Publication No. WO03/019713A1, the high energy density can be realized by setting the voltage upon charging to 4.25V or more.

However, a polyolefin microporous membrane used in the non-aqueous electrolyte secondary battery has the following problem. If the charge voltage is set to 4.25V or more, particularly, an oxidation atmosphere near the cathode surface is enhanced, so that the non-aqueous electrolyte material and the separator which physically come into contact with the cathode are easily subjected to oxidation decomposition. Thus, an internal resistance increases and battery characteristics deteriorate. Even if the charge voltage is smaller than 4.25V, it is preferable to suppress the deterioration of the battery characteristics by using the separator having an oxidation resistance.

It is, therefore, desirable to provide a separator and a non-aqueous electrolyte battery which can suppress a deterioration of battery characteristics.

SUMMARY

According to an embodiment, there is provided a separator having a structure in which a resin layer is formed at least on one principal plane of a base material layer, wherein the resin layer has an inorganic substance.

According to another embodiment, there is provided a non-aqueous electrolyte battery in which a cathode and an anode are arranged through a separator so as to face each other, wherein the separator has a structure in which a resin layer is formed at least on one principal plane of a base material layer and the resin layer has an inorganic substance.

According to the embodiments, since the separator has a structure in which the resin layer having the inorganic substance has been formed at least on one principal plane of the base material layer, the separator has excellent oxidation resistance, so that the deterioration of the battery characteristics can be suppressed.

According to the embodiments, the durability of the separator is improved and the deterioration of the battery characteristics can be suppressed.

According to the embodiments, since the inorganic substances are on the surface of the separator, the separator has good heat resistance properties. Therefore, in the embodiments, both good oxidation resistance and good heat resistance can be attained.

According to the embodiments, friction on the surface of the separator is reduced by the inorganic substances, which leads to the easiness of the pull out of the center core for rolling which brings about the effective manufacture of the rolled electrode.

According to an embodiment, the inorganic substance is well kept on the surface of the separator by the resin, and therefore the deterioration of the separator by unload of the inorganic substance is prevented.

Additional features and advantages are described herein, and will be apparent from, the following Detailed Description and the figures.

DETAILED DESCRIPTION

(1) First Embodiment (1-1) Construction of Non-aqueous Electrolyte Battery

Figure 1:
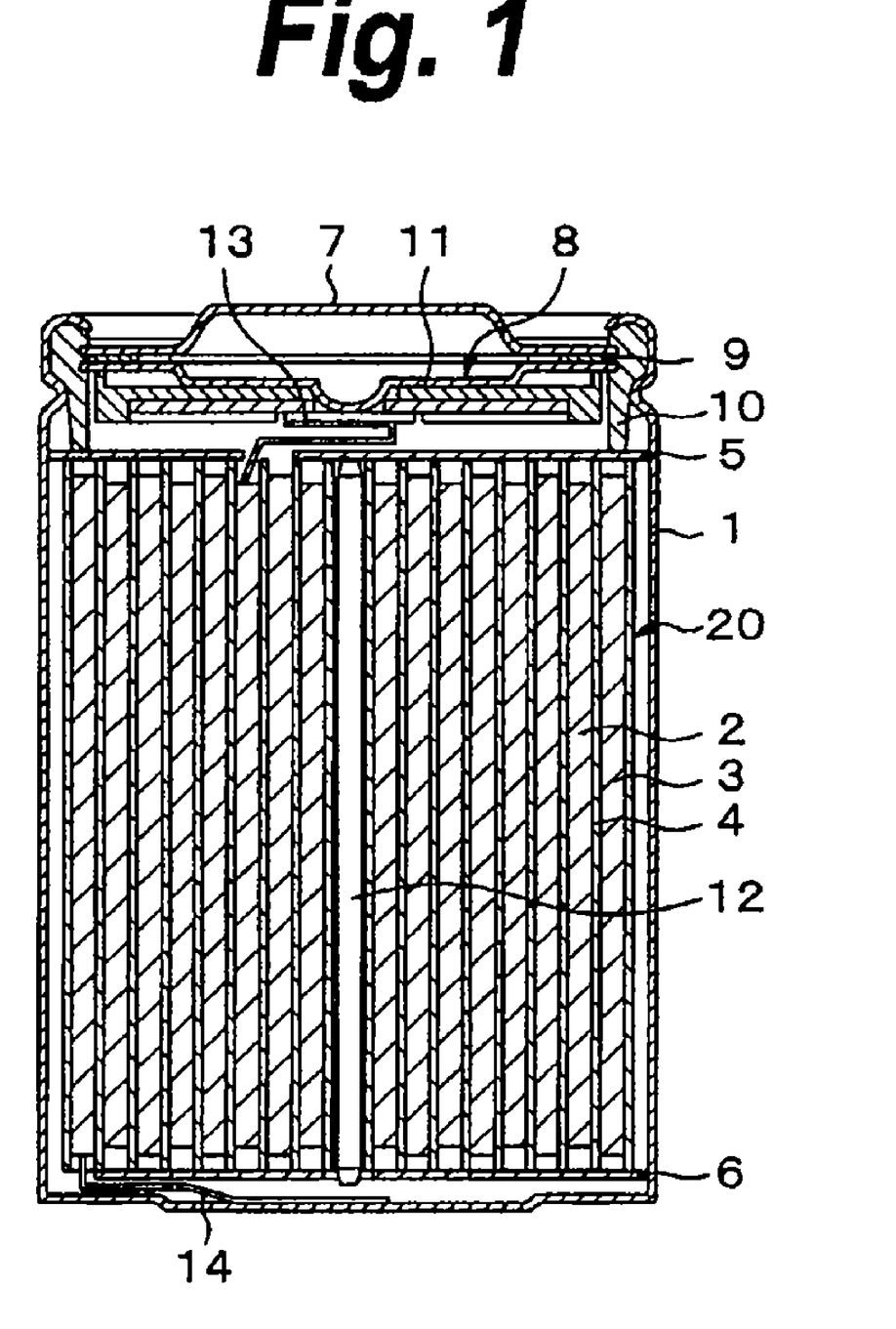
FIG. 1 is a schematic cross sectional view of a non-aqueous electrolyte battery according to the first embodiment.

An embodiment is described hereinbelow with reference to the drawings. FIG. 1 shows a cross sectional structure of a secondary battery using a microporous membrane according to the first embodiment.

In the secondary battery, an open circuit voltage in a complete charging state (hereinafter, properly referred to as a fully charged state) per pair of positive and anodes lies within, for example, a range from 4.2 to 4.6 V (both inclusive) or a range from 4.25 to 4.6 V (both inclusive). This secondary battery is what is called a cylindrical type and a winded electrode member 20 in which a belt-shaped cathode 2 and a belt-shaped anode 3 have been wound through a separator 4 is provided in an almost hollow cylindrical battery can 1.

The battery can 1 is made of iron (Fe) plated with, for example, nickel (Ni). One end portion of the battery can 1 is closed and the other end portion is opened. A pair of insulating plates 5 and 6 are arranged in the battery can 1 perpendicularly to a winding circumferential surface so as to sandwich the winded electrode member 20, respectively.

A battery cap 7 and a relief valve mechanism 8 and a thermally-sensitive resistive element (PTC element: Positive Temperature Coefficient element) 9 provided in the battery cap 7 are caulked through a gasket 10 and attached to the open end portion of the battery can 1. The inside of the battery can 1 is sealed. The battery cap 7 is made of, for example, a material similar to that of the battery can 1. The relief valve mechanism 8 is electrically connected to the battery cap 7 through the PTC element 9. When an inner pressure of the battery rises to a predetermined value or more due to an inner short-circuit, heating from the outside, or the like, a disk plate 11 is turned round, thereby disconnecting the electrical connection between the battery cap 7 and the winded electrode member 20. When a temperature rises, a current is limited due to an increase in resistance value of the PTC element 9 and abnormal heat generation by the large current is prevented. The gasket 10 is made of, for example, an insulating material and its surface is coated with asphalt.

The winded electrode member 20 is wound around, for example, a center pin 12 as a center. A cathode lead 13 made of aluminum or the like is connected to the cathode 2 of the winded electrode member 20. An anode lead 14 made of nickel or the like is connected to the anode 3. The cathode lead 13 is welded to the relief valve mechanism 8, so that it is electrically connected to the battery cap 7. The anode lead 14 is welded and electrically connected to the battery can 1.

[Cathode]

Figure 2:
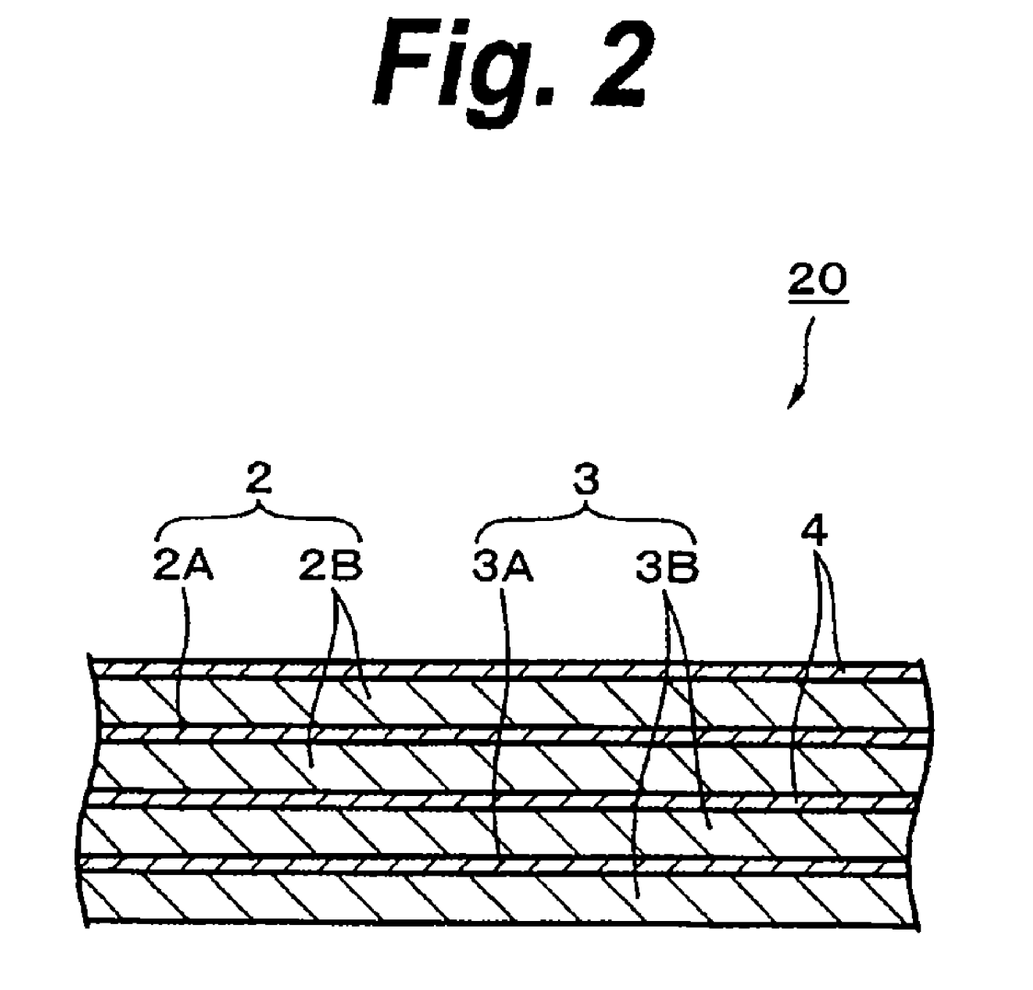
FIG. 2 is a partially enlarged cross sectional view of a winded electrode member shown in FIG. 1.

FIG. 2 partially enlargedly shows the winded electrode member 20 shown in FIG. 1. As shown in FIG. 2, for example, the cathode 2 has: a cathode collector 2A having a pair of surfaces which face each other; and cathode mixture layers 2B formed on both surfaces of the cathode collector 2A. The cathode 2 may have an area in which the cathode mixture layer 2B has been formed only on one surface of the cathode collector 2A. The cathode collector 2A is made of, for example, a metal foil such as an aluminum (Al) foil or the like. The cathode mixture layer 2B contains, for example, a cathode active material and may contain a conductive material such as graphite or the like and a binder such as polyvinylidene fluoride or the like as necessary.

A compound containing lithium, for example, a lithium oxide, a lithium sulfide, or an interlayer compound containing lithium is properly used as a cathode active material, or two or more kinds of them may be mixed and used. Particularly, in order to increase an energy density, it is preferable that a lithium composite oxide consisting of $Li_xMO_2$ as a main material is contained as a cathode active material. It is preferable that M is one or more kinds of transition metals. Specifically speaking, it is preferable that M is at least one kind selected from a group of cobalt (Co), nickel (Ni), manganese (Mn), iron (Fe), aluminum (Al), vanadium (V), and titanium (Ti). x differs in dependence on a charging/discharging state of the battery and is generally set to a value within a range of $0.05 \leq x \leq 1.10$. As a specific example of such a lithium composite oxide, for example, $Li_aCoO_2$ ($a \approx 1$), or $Li_bNiO_2$ ($b \approx 1$), or $Li_cNi_dCo_{1-d}O_2$ ($c \approx 1, 0 < d < 1$) can be mentioned. As a lithium composite oxide, $Li_eMn_2O_4$ ($e \approx 1$) having a spinel structure or $Li_fFePO_4$ ($f \approx 1$) having an olivin structure can be mentioned.

More specifically speaking, a lithium transition metal composite oxide having compositions expressed by the following (Formula 1) to (Formula 4) can be used.

$$Li[Li_xMn_{(1-x-y-z)}Ni_yM'_z]O_{(2-a)}F_b \quad \text{(Formula 1)}$$

(in the formula, M' denotes at least one or more kinds of elements selected from cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten (W); x is set to a value within a range of $0 < x \leq 0.2$; y is set to a value within a range of $0.3 \leq y \leq 0.8$; z is set to a value within a range of $0 \leq z \leq 0.5$; a is set to a value within a range of $-0.1 \leq a \leq 0.2$; and b is set to a value within a range of $0 \leq b \leq 0.1$).

$$Li_cNi_{(1-d)}M''_dO_{(2-e)}F_f \quad \text{(Formula 2)}$$

(in the formula, M'' denotes at least one or more kinds of elements selected from cobalt (Co), manganese (Mg), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W); c is set to a value within a range of $-0.1 \leq c \leq 0.1$; d is set to a value within a range of $0.005 \leq d \leq 0.5$; e is set to a value within a range of $-0.1 \leq e \leq 0.2$; and f is set to a value within a range of $0 \leq f \leq 0.1$).

$$Li_cCo_{(1-d)}M'''_dO_{(2-e)}F_f \quad \text{(Formula 3)}$$

(in the formula, M''' denotes at least one or more kinds of elements selected from nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W); c is set to a value within a range of $-0.1 \leq c \leq 0.1$; d is set to a value within a range of $0 \leq d \leq 0.5$; e is set to a value within a range of $-0.1 \leq e \leq 0.2$; and f is set to a value within a range of $0 \leq f \leq 0.1$).

$$Li_sMn_{2-t}M''''_tO_uF_v \quad \text{(Formula 4)}$$

(in the formula, M'''' denotes at least one or more kinds of elements selected from cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W); s is set to a value within a range of $s \geq 0.9$; t is set to a value within a range of $0.005 \leq t \leq 0.6$; u is set to a value within a range of $3.7 \leq u \leq 4.1$; and v is set to a value within a range of $0 \leq v \leq 0.1$).

A lithium transition metal composite phosphate having compositions expressed by the following (Formula 5) can be used.

$$LiM''''PO_4 \quad \text{(Formula 5)}$$

(in the formula, M'''' denotes at least one or more kinds of elements selected from cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr)).

[Anode]

As shown in FIG. 2, for example, the anode 3 has: an anode collector 3A having a pair of surfaces which face each other; and anode mixture layers 3B formed on both surfaces of the anode collector 3A. The anode 3 may have an area in which the anode mixture layer 3B has been formed only on one surface of the anode collector 3A. The anode collector 3A is made of, for example, a metal foil such as a copper (Cu) foil or the like. The anode mixture layer 3B contains, for example, an anode active material and may contain a binder such as polyvinylidene fluoride or the like as necessary.

An anode material which can dope and dedope lithium (hereinafter, properly referred to as an anode material which can dope/dedope lithium) is contained as an anode active material. As an anode material which can dope/dedope lithium, for example, a carbon material, a metal compound, an oxide, a sulfide, a lithium nitride such as $LiN_3$, lithium metal, metal which forms an alloy together with lithium, a high molecular material, or the like can be mentioned.

As a carbon material, for example, graphitization-retardant carbon, graphitization-easy carbon, graphite, a pyrolytic carbon class, a coke class, a glassy carbon class, an organic high molecular compound baked material, carbon fiber, or activated charcoal can be used. Among them, there is a pitch coke, a needle coke, a petroleum coke, or the like as a coke. The organic high molecular compound baked material denotes a material obtained by baking a high molecular material such as phenol resin, fran resin, or the like at a proper temperature and carbonating it. A part of those materials are classified into graphitization-retardant carbon or graphitization-easy carbon. Polyacetylene, polypyrrole, or the like can be mentioned as a high molecular material.

Among such anode materials which can dope/dedope such lithium, a material whose charge/discharge potential is relatively close to that of lithium metal is preferable. This is because the lower the charge/discharge potential of the anode 3 is, the easier the high-energy density of the battery can be realized. Among them, the carbon material is preferable in that a change in crystal structure occurring upon charging/discharging is very small, a high charge/discharge capacitance can be obtained, and good cycle characteristics can be obtained. Particularly, graphite is preferable from the viewpoint that an electrochemical equivalent is large and a high energy density can be obtained. In addition, graphitization-retardant carbon is preferable from the viewpoint that excellent cycle characteristics can be obtained.

As an anode material which can dope/dedope lithium, a lithium metal simple substance or a simple substance, an alloy, or a compound of metal elements or semimetal elements which can form an alloy together with lithium can be mentioned. They are preferable because the high energy density can be obtained. Particularly, if such a material is used together with the carbon material, it is more preferable because the high energy density can be obtained and excellent cycle characteristics can also be obtained. In the specification, among alloys, in addition to an alloy consisting of two or more kinds of metal elements, an alloy consisting of one or more kinds of metal elements and one or more kinds of semimetal elements is also included. As its texture, there is a solid solution, an eutectic (eutectic mixture), an intermetallic compound, or a texture in which two or more kinds coexist.

As such a metal element or semimetal element, tin (Sn), lead (Pb), aluminum (Al), indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y), or hafnium (Hf) can be mentioned. As an alloy or a compound, for example, a material expressed by a chemical formula $Ma_sMb_tLi_u$ or a chemical formula $Ma_pMc_qMd_r$ can be mentioned. In those chemical formulae, Ma denotes at least one kind of metal element and semimetal element which can form an alloy together with lithium, Mb denotes at least one kind of metal element and semimetal element other than lithium and Ma, Mc denotes at least one kind of non-metal element, and Md denotes at least one kind of metal element and semimetal element other than Ma. Values of s, t, u, p, q, and r are set to s>0, t≧0, u≧0, p>0, q>0, and r≧0, respectively.

Among them, a simple substance, an alloy, or a compound of metal elements or semimetal elements of the 4B group in the short period type periodic table is preferable. Silicon, tin, or an alloy or a compound thereof is particularly preferable. They may be crystalline or amorphous.

As another material, an inorganic compound which does not contain lithium, such as $MnO_2$, $V_2O_5$, $V_6O_{13}$, NiS, MoS, or the like can be also used for either the cathode or the anode.

[Electrolytic Solution]

As an electrolytic solution, a non-aqueous electrolytic solution obtained by dissolving an electrolytic salt into a non-aqueous solvent can be used. As a non-aqueous solvent, for example, it is preferable to contain at least either ethylene carbonate or propylene carbonate because the cycle characteristics can be improved. Particularly, it is preferable that ethylene carbonate and propylene carbonate are mixed and contained because the cycle characteristics can be further improved. As a non-aqueous solvent, it is preferable to contain at least one kind selected from chain-like carbonic esters such as diethyl carbonate, dimethyl carbonate, ethylmethyl carbonate, and methylpropyl carbonate, and the like because the cycle characteristics can be further improved.

Further, as a non-aqueous solvent, it is preferable to contain at least either 2,4-difluoroanisole or vinylene carbonate. This is because the discharge capacitance can be improved in the case of 2,4-difluoroanisole and the cycle characteristics can be further improved in the case of vinylene carbonate. Particularly, if they are mixed and contained, it is more preferable because both of the discharge capacitance and the cycle characteristics can be improved.

Moreover, as a non-aqueous solvent, it is also possible to contain one kind or two or more kinds selected from butylene carbonate, γ-butyrolactone, γ-valerolactone, a material in which a part or all of a hydrogen radical of a compound of them is replaced by a fluorine radical, 1,2-dimethoxy ethane, tetrahydrofuran, 2-methyl tetrahydrofuran, 1,3-dioxorane, 4-methyl-1,3-dioxorane, methyl acetate, methyl propionate, acetonitrile, glutaronitrile, adiponitrile, methoxy acetonitrile, 3-methoxy propylonitrile, N,N-dimethyl formamide, N-methyl pyrrolidinone, N-methyl oxazolidinone, N,N-dimethyl imidazolidinone, nitromethane, nitroethane, sulfolan, dimethyl sulfoxide, trimethyl phosphate, and the like.

In dependence on the electrode which is combined, there is a case where the reversibility of the electrode reaction is improved by using a material in which a part or all of the hydrogen atoms of the substance contained in the group of non-aqueous solvents mentioned above has been replaced by fluorine atoms. Therefore, those substances can be also properly used as a non-aqueous solvent.

As a lithium salt as an electrolytic salt, for example, $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, $LiBF_2(ox)$[lithium difluoro (oxalato) borate], LiBOB, or LiBr is properly used. One kind or two or more kinds of them can be mixed and used. Among them, $LiPF_6$ is preferable from viewpoints that the high ion conductivity can be obtained and the cycle characteristics can be improved.

[Separator]

Figure 3:
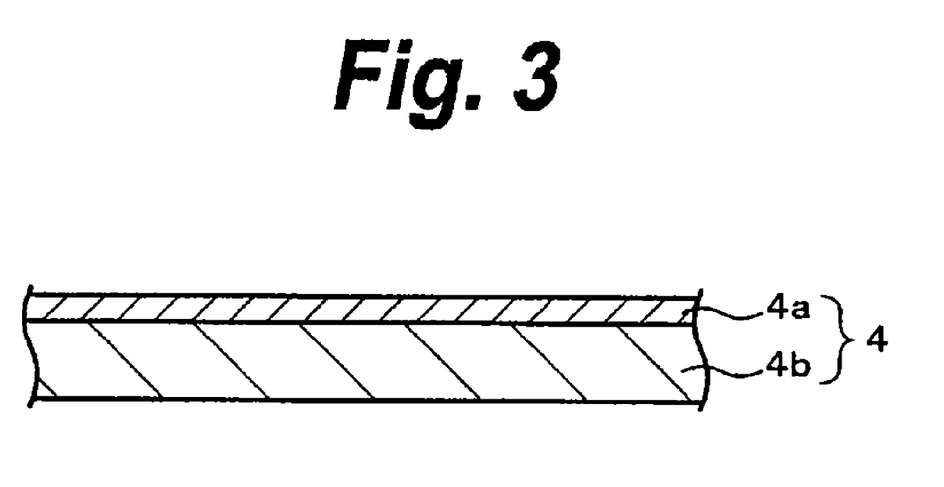
FIG. 3 is an enlarged cross sectional view of an example of a separator.

Examples of a structure of the separator 4 are described below with reference to FIGS. 3 and 4. FIG. 3 is an enlarged cross sectional view of an example of the structure of the separator 4. As shown in FIG. 3, the separator 4 has the structure in which a resin layer 4a has been formed on one principal plane of a base material layer 4b. As a material of the base material layer 4b, the materials used in the battery of the related art can be used. Among them, it is particularly preferable to use a microporous film made of polyolefin in which an excellent short-circuit preventing effect is obtained and safety of the battery can be improved owing to the shut-down effect.

Specifically speaking, a microporous membrane made of, for example, polyethylene or polypropylene resin is preferable. Although the base material layer 4b shown in FIG. 3 has the structure of a single layer, the base material layer 4b may have a multi-layer structure. More specifically speaking, for example, a microporous membrane having a triple-layer structure obtained by sequentially laminating a polypropylene (PP) layer, a polyethylene (PE) layer, and a PP layer, or the like can be used.

The resin layer 4a is a matrix resin layer in which an inorganic substance has been held and which has high porosity. Since the battery has the resin layer 4a in which the inorganic substance has been held in the matrix resin, oxidation resistance can be obtained and the deterioration of the separator 4 can be suppressed.

As a matrix resin, more specifically speaking, for example, polyvinylidene fluoride (PVdF), hexafluoro propylene (HFP), polytetrafluoro ethylene (PTFE), or the like can be used or their copolymer can be also used.

As an inorganic substance, a metal, a semiconductor, or their oxide or nitride can be mentioned. Specifically speaking, for example, aluminum (Al), titanium (Ti), or the like can be mentioned as a metal. For example, silicon (Si), boron (B), or the like can be mentioned as a semiconductor. Alumina ($Al_2O_3$), boron nitride (BN), aluminum nitride (AlN), titanium dioxide ($TiO_2$), silicon dioxide ($SiO_2$), or the like can be mentioned as an oxide or a nitride. A substance in which it has no conductivity, it can be easily obtained, and a heat capacitance is large is preferable as an inorganic substance. This is because if the heat capacitance is large, the inorganic substance is useful as a heat sink upon current heat generation and functions so as to suppress thermo-runaway. As such an inorganic substance, for example, alumina ($Al_2O_3$), boron nitride (BN), aluminum nitride (AlN), titanium dioxide ($TiO_2$), silicon dioxide ($SiO_2$), or the like can be mentioned.

It is preferable that a particle size of the inorganic substance lies within a range from 1 nm to 10 μm, both inclusive. This is because if the particle size is smaller than 1 nm, it is difficult to obtain the inorganic substance and even if the inorganic substance can be obtained, it is unreasonable in terms of the costs. If the particle size is larger than 10 μm, a distance between the electrodes is large, it is difficult to obtain a sufficient filling amount of the active material because of a limited space, and the battery capacitance is small.

A method of forming the resin layer 4a, for example, is as follows. The surface base material for the base material layer 4b is coated with a slurry made of the matrix resin, solvent, and inorganic substance, and allowed to be immersed through a solvent bath so as to be phase-separated, and thereafter dried, so that the resin layer 4a can be formed. In the bath contained the solvent being a poor solvent for the matrix resin and at the same time good solvent for the solvent in said slurry.

It is preferable that a piercing strength of the separator 4 lies within a range from 100 to 1000 gf, both inclusive. This is because if the piercing strength is small, there is a case where a short-circuit occurs and, if it is large, an ion conductivity deteriorates.

It is preferable that an air permeability of the separator 4 lies within a range from 30 sec/100 cc to 1000 sec/100 cc, both inclusive. This is because if the air permeability is low, there is a case where the short-circuit occurs and, if it is high, the ion conductivity deteriorates.

Figure 4:
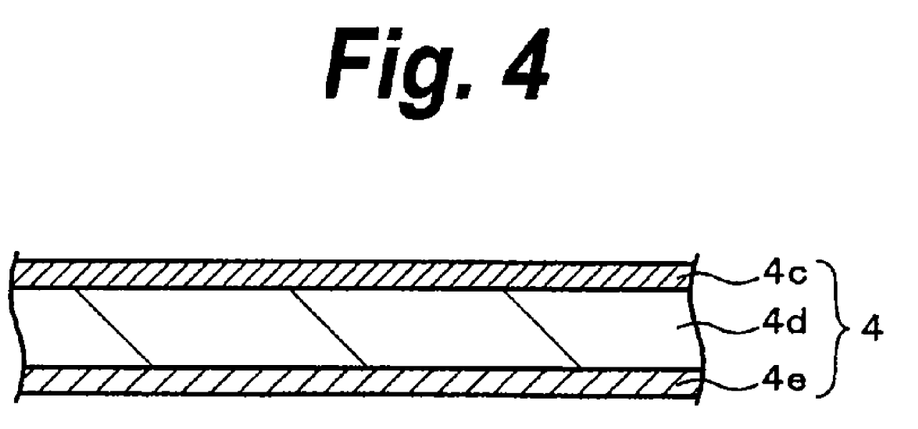
FIG. 4 is an enlarged cross sectional view of another example of the separator.

FIG. 4 is an enlarged cross sectional view showing another example of the separator 4. As shown in FIG. 4, the separator 4 has a structure in which a resin layer 4c and a resin layer 4e have been formed on both surfaces of the base material layer 4b. Since constructions other than the structure of the separator 4 are similar to those in the foregoing example, their detailed explanation is omitted here.

(1-2) Manufacturing Method of Non-aqueous Electrolyte Battery

A manufacturing method of the non-aqueous electrolyte battery according to the first embodiment is described below. The manufacturing method of the non-aqueous electrolyte battery will be explained hereinbelow with respect to a cylindrical non-aqueous electrolyte battery as an example.

The cathode 2 is manufactured as follows. First, for example, by mixing the cathode active material, conductive material, and binder, the cathode mixture is adjusted and formed. This cathode mixture is dispersed into the solvent of, for example, N-methyl-2-pyrolidone or the like, thereby forming the cathode mixture slurry.

Subsequently, the cathode collector 2A is coated with the cathode mixture slurry, the solvent is dried, thereafter, the obtained collector is compression-molded by a roll pressing machine or the like, the cathode mixture layer 2B is formed, and the cathode 2 is manufactured.

The anode 3 is manufactured as follows. First, the anode active material and binder are mixed and the anode mixture is adjusted and formed. This anode mixture is dispersed into the solvent of, for example, N-methyl-2-pyrolidone or the like, thereby forming the anode mixture slurry.

Subsequently, the anode collector 3A is coated with the anode mixture slurry, the solvent is dried, thereafter, the obtained collector is compression-molded by the roll pressing machine or the like, the anode mixture layer 3B is formed, and the anode 3 is manufactured.

Subsequently, the cathode lead 13 is attached to the cathode collector 2A by, for example, welding or the like and the anode lead 14 is attached to the anode collector 3A by welding or the like. The cathode 2 and the anode 3 are wound through the separator 4, a front end portion of the cathode lead 13 is welded to the relief valve mechanism 8, a front end portion of the anode lead 14 is welded to the battery can 1, and the wound cathode 2 and anode 3 are sandwiched by a pair of insulating plates 5 and 6 and enclosed in the battery can 1.

Subsequently, the electrolytic solution is injected into the battery can 1 and dipped into the separator 4. The battery cap 7, relief valve mechanism 8, and PTC element 9 are caulked and fixed to the open end portion of the battery can 1 through the gasket 10. Thus, the non-aqueous electrolyte battery according to the first embodiment is manufactured in this manner.

In the non-aqueous electrolyte battery according to the first embodiment, when the charge is performed, for example, lithium ions are dedoped from the cathode 2 and doped into the anode 3 through the electrolytic solution. When the discharge is performed, for example, the lithium ions are dedoped from the anode 3 and doped into the cathode 2 through the electrolytic solution. According to the first embodiment, it is possible to provide the non-aqueous electrolytic solution secondary battery in which the separator 4 has the excellent oxidation resistance and the energy density is high.

(2) Second Embodiment (2-1) Construction of Non-aqueous Electrolyte Battery

Figure 5:
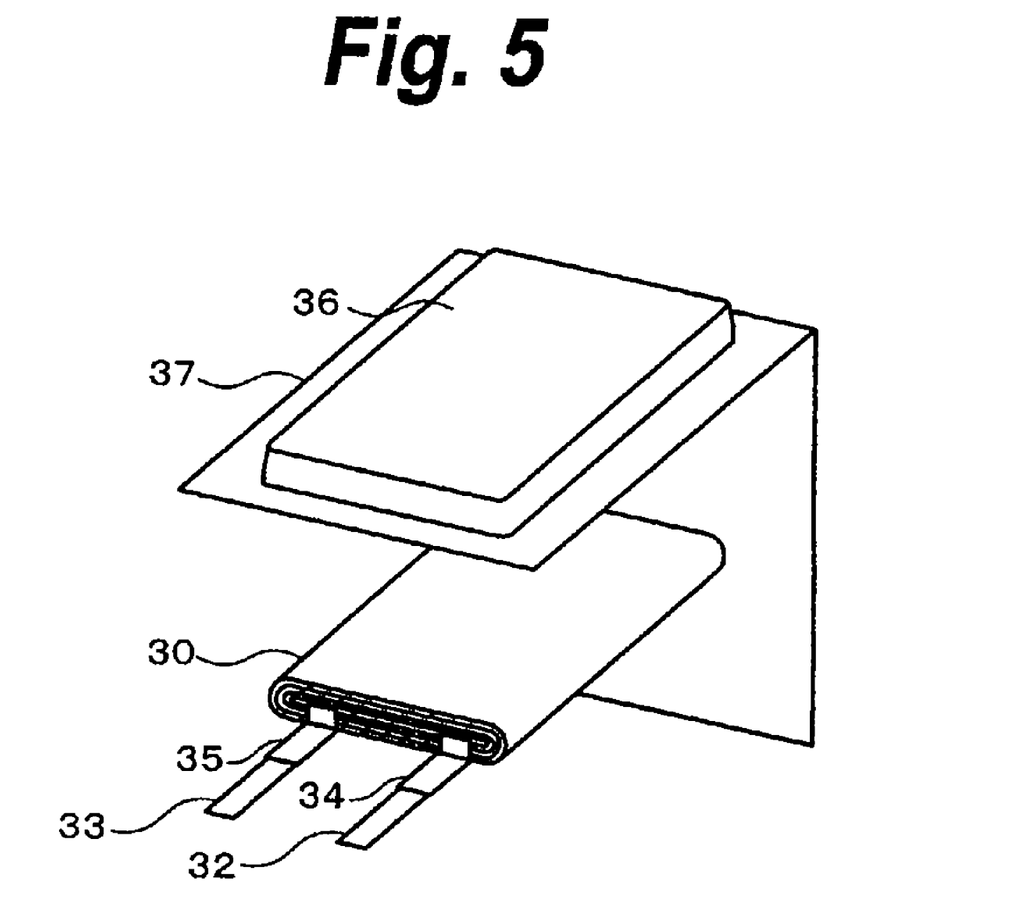
FIG. 5 is a schematic diagram showing a structure of a non-aqueous electrolyte battery according to the second embodiment.

FIG. 5 is a schematic diagram showing a structure of a non-aqueous electrolyte battery according to the second embodiment. As shown in FIG. 5, the non-aqueous electrolyte battery is formed by a method whereby a battery element 30 is enclosed into a sheathing member 37 made of a moisture-proof laminate film and the circumference of the battery element 30 is welded so as to be sealed. A cathode lead 32 and an anode lead 33 are provided for the battery element 30. Those leads are sandwiched by the sheathing member 37 and led out to the outside. Both surfaces of each of the cathode lead 32 and the anode lead 33 are covered with resin members 34 and 35 in order to improve adhesion with the sheathing member 37.

[Sheathing Member]

The sheathing member 37 has a laminate structure in which, for example, an adhesive layer, a metal layer, and a surface protecting layer have sequentially been laminated. The adhesive layer is made of a high molecular film. As a material constructing the high molecular film, for example, polypropylene (PP), polyethylene (PE), casted polypropylene (non-oriented polypropylene) (CPP), linear low-density polyethylene (LLDPE), or a low-density polyethylene (LDPE) can be mentioned. The metal layer is made of a metal foil. As a material constructing the metal foil, for example, aluminum (Al) can be mentioned. As a material constructing the metal foil, metal other than aluminum can be also used. As a material constructing the surface protecting layer, for example, nylon (Ny) or polyethylene terephthalate (PET) can be mentioned. The surface of the adhesive layer becomes an enclosing surface of the side where the battery element 30 is enclosed.

[Battery Element]

Figure 6:
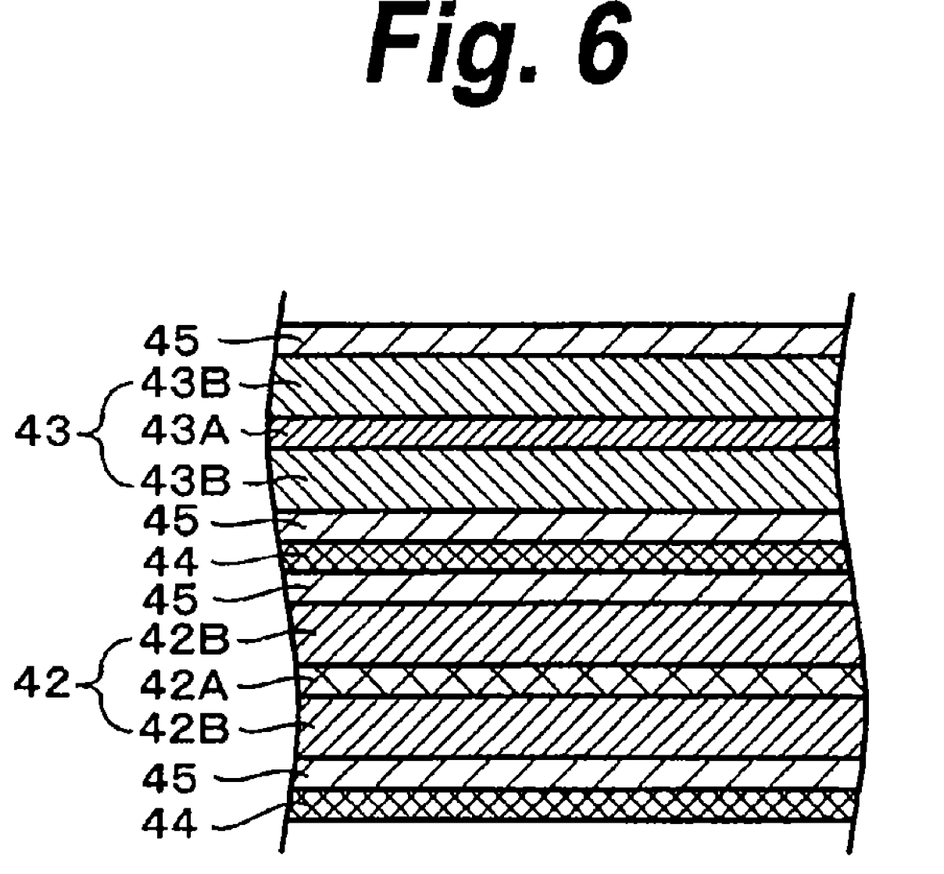
FIG. 6 is a partially enlarged cross sectional view of a battery element shown in FIG. 5.

For example, as shown in FIG. 6, the battery element 30 is a winding type battery element 30 constructed in such a manner that a belt-shaped anode 43 provided with gel electrolyte layers 45 on both sides, a separator 44, a belt-shaped cathode 42 provided with the gel electrolyte layers 45 on both sides, and the separator 44 are laminated and wound in the longitudinal direction.

The cathode 42 is constructed by a belt-shaped cathode collector 42A and cathode active material layers 42B formed on both surfaces of the cathode collector 42A. The cathode collector 42A is a metal foil made of, for example, aluminum (Al) or the like.

The cathode lead 32 connected by, for example, spot welding or ultrasonic welding is provided for one end portion in the longitudinal direction of the cathode 42. As a material of the cathode lead 32, for example, a metal such as aluminum or the like can be used.

The anode 43 is constructed by a belt-shaped anode collector 43A and anode active material layers 43B formed on both surfaces of the anode collector 43A. The anode collector 43A is constructed by, for example, a metal foil such as copper (Cu) foil, nickel foil, stainless foil, or the like.

The anode lead 33 connected by, for example, the spot welding or ultrasonic welding is also provided for one end portion in the longitudinal direction of the anode 43 in a manner similar to the cathode 42. As a material of the anode lead 33, for example, copper (Cu), nickel (Ni), or the like can be used.

Since a construction other than the gel electrolyte layer 45 is similar to that of the foregoing first embodiment, explanation is made below with respect to the gel electrolyte layer 45.

The gel electrolyte layer 45 contains an electrolytic solution and a high molecular compound serving as a holding member to hold the electrolytic solution and is in what is called a gel state. The gel electrolyte layer 45 is preferable because the high ion conductivity can be obtained and a leakage of a solution in the battery can be prevented. A construction of the electrolytic solution (that is, a liquid solvent, electrolytic salt, additive agent) is similar to that in the first embodiment.

As a high molecular compound, for example, there can be mentioned: polyacrylonitrile; polyvinylidene fluoride; copolymer of vinylidene fluoride and hexafluoro propylene; polytetrafluoro ethylene; polyhexafluoro propylene; polyethylene oxide; polypropylene oxide; polyphosphazene; polysiloxane; polyvinyl acetate; polyvinyl alcohol; polymethyl methacrylate; polyacrylic acid; polymethacrylate; styrene-butadiene rubber; nitrile-butadiene rubber; polystyrene; polycarbonate; or the like. Polyacrylonitrile, polyvinylidene fluoride, polyhexafluoro propylene, or polyethylene oxide is preferable, particularly, from a viewpoint of electrochemical stability.

(2-2) Manufacturing Method of Non-aqueous Electrolyte Battery

A manufacturing method of the non-aqueous electrolyte battery according to the second embodiment of the invention is described below. First, each of the cathode 42 and the anode 43 is coated with a presolvent containing a solvent, electrolytic salt, a high molecular compound and a mixed solvent, and the mixed solvent is volatilized, thereby forming the gel electrolyte layer 45. The cathode lead 32 is preliminarily attached to an end portion of the cathode collector 42A by welding. The anode lead 33 is also preliminarily attached to an end portion of the anode collector 43A by welding.

Subsequently, the cathode 42 and anode 43 on each of which the gel electrolyte layer 45 has been formed are laminated through the separator 44, thereby obtaining a laminate. After that, this laminate is wound in its longitudinal direction, thereby forming the winding type battery element 30.

Then, a concave portion 36 is formed by deep-drawing the sheathing member 37 made of a laminate film. The battery element 30 is inserted into the concave portion 36. An unprocessed portion of the sheathing member 37 is folded to an upper portion of the concave portion 36 and an outer peripheral portion of the concave portion 36 is thermally welded, thereby sealing. In this manner, the non-aqueous electrolyte battery according to the second embodiment is manufactured.

EXAMPLES

Examples are described below. However, it should be appreciated that the embodiments are not limited to the following Examples.

TABLE 1

|  | CHARGE VOLTAGE (V) | POSITIVE ELECTRODE MATERIAL | NEGATIVE ELECTRODE MATERIAL | EL | BASE MATERIAL LAYER | | HOLDING SUBSTANCE | |
|---|---|---|---|---|---|---|---|---|
|  |  |  |  |  | MATERIAL | THICKNESS (μM) | MATERIAL | PARTICLE SIZE (nm) |
| EXAMPLE 1 | 4.2 | $LiCoO_2$ | GRAPHITE | Liquid | PE | 16 | $Al_2O_3$ | 250 |
| EXAMPLE 2 | 4.25 | $LiCoO_2$ | GRAPHITE | Liquid | PE | 16 | $Al_2O_3$ | 250 |
| EXAMPLE 3 | 4.3 | $LiCoO_2$ | GRAPHITE | Liquid | PE | 16 | $Al_2O_3$ | 250 |
| EXAMPLE 4 | 4.35 | $LiCoO_2$ | GRAPHITE | Liquid | PE | 16 | $Al_2O_3$ | 250 |
| EXAMPLE 5 | 4.4 | $LiCoO_2$ | GRAPHITE | Liquid | PE | 16 | $Al_2O_3$ | 250 |
| EXAMPLE 6 | 4.45 | $LiCoO_2$ | GRAPHITE | Liquid | PE | 16 | $Al_2O_3$ | 250 |
| EXAMPLE 7 | 4.5 | $LiCoO_2$ | GRAPHITE | Liquid | PE | 16 | $Al_2O_3$ | 250 |
| EXAMPLE 8 | 4.55 | $LiCoO_2$ | GRAPHITE | Liquid | PE | 16 | $Al_2O_3$ | 250 |
| EXAMPLE 9 | 4.6 | $LiCoO_2$ | GRAPHITE | Liquid | PE | 16 | $Al_2O_3$ | 250 |
| EXAMPLE 10 | 4.35 | $LiCoO_2$ | GRAPHITE | Liquid | PE | 16 | $Al_2O_3$ | 7 |
| EXAMPLE 11 | 4.35 | $LiCoO_2$ | GRAPHITE | Liquid | PE | 16 | $Al_2O_3$ | 16 |
| EXAMPLE 12 | 4.35 | $LiCoO_2$ | GRAPHITE | Liquid | PE | 16 | $Al_2O_3$ | 40 |
| EXAMPLE 13 | 4.35 | $LiCoO_2$ | GRAPHITE | Liquid | PE | 16 | $Al_2O_3$ | 140 |
| EXAMPLE 14 | 4.35 | $LiCoO_2$ | GRAPHITE | Liquid | PE | 16 | $Al_2O_3$ | 380 |
| EXAMPLE 15 | 4.35 | $LiCoO_2$ | GRAPHITE | Liquid | PE | 16 | BN | 140 |
| EXAMPLE 16 | 4.35 | $LiCoO_2$ | GRAPHITE | Liquid | PE | 16 | AlN | 140 |
| EXAMPLE 17 | 4.35 | $LiCoO_2$ | GRAPHITE | Liquid | PE | 16 | $TrO_2$ | 140 |
| EXAMPLE 18 | 4.35 | $LiCoO_2$ | GRAPHITE | Liquid | PE | 16 | $SiO_2$ | 140 |
| EXAMPLE 19 | 4.35 | $LiCoO_2$ | Li | Liquid | PE | 16 | $Al_2O_3$ | 250 |
| EXAMPLE 20 | 4.35 | $LiCoO_2$ | Si | Liquid | PE | 16 | $Al_2O_3$ | 250 |
| EXAMPLE 21 | 4.35 | $LiCoO_2$ | SnCo | Liquid | PE | 16 | $Al_2O_3$ | 250 |
| EXAMPLE 22 | 4.35 | $LiCoO_2$ | GRAPHITE | Liquid | PE | 5 | $Al_2O_3$ | 250 |
| EXAMPLE 23 | 4.35 | $LiCoO_2$ | GRAPHITE | Liquid | PE | 7 | $Al_2O_3$ | 250 |
| EXAMPLE 24 | 4.35 | $LiCoO_2$ | GRAPHITE | Liquid | PE | 9 | $Al_2O_3$ | 250 |
| EXAMPLE 25 | 4.35 | $LiCoO_2$ | GRAPHITE | Liquid | PE | 20 | $Al_2O_3$ | 250 |
| EXAMPLE 26 | 4.35 | $LiCoO_2$ | GRAPHITE | Liquid | PP/PE | 16 | $Al_2O_3$ | 250 |
| EXAMPLE 27 | 4.35 | $LiCoO_2$ | GRAPHITE | Liquid | PE | 16 | $Al_2O_3$ | 250 |
| EXAMPLE 28 | 4.35 | $LiCoO_2$ | GRAPHITE | Liquid | PE | 16 | $Al_2O_3$ | 250 |
| EXAMPLE 29 | 4.35 | $LiCoO_2$ | GRAPHITE | Liquid | PE | 16 | $Al_2O_3$ | 250 |
| EXAMPLE 30 | 4.35 | $LiCoO_2$ | GRAPHITE | Liquid | PE | 16 | $Al_2O_3$ | 250 |
| EXAMPLE 31 | 4.35 | $LiCoO_2$ | GRAPHITE | Liquid | PE | 16 | $Al_2O_3$ | 250 |
| EXAMPLE 32 | 4.35 | $LiCoO_2$ | GRAPHITE | Liquid | PE | 16 | $Al_2O_3$ | 250 |
| EXAMPLE 33 | 4.35 | $LiCoO_2$/NCM = 8/2 | GRAPHITE | Liquid | PE | 16 | $Al_2O_3$ | 250 |
| EXAMPLE 34 | 4.35 | $LiNiMnO_4$ | GRAPHITE | Liquid | PE | 16 | $Al_2O_3$ | 250 |
| EXAMPLE 35 | 4.35 | $LiCoPO_4$ | GRAPHITE | Liquid | PE | 16 | $Al_2O_3$ | 250 |
| EXAMPLE 36 | 4.35 | $LiCoO_2$ | GRAPHITE | Liquid | PE | 16 | $Al_2O_3$ | 250 |
| EXAMPLE 37 | 4.35 | $LiCoO_2$ | GRAPHITE | Liquid | PE | 16 | $Al_2O_3$ | 250 |
| COMPARISON 1 | 4.35 | $LiCoO_2$ | GRAPHITE | Liquid | PE | 16 | — | — |
| COMPARISON 2 | 4.35 | $LiCoO_2$ | GRAPHITE | Liquid | PE | 20 | — | — |
| COMPARISON 3 | 4.35 | $LiCoO_2$ | Li | Liquid | PE | 20 | — | — |
| COMPARISON 4 | 4.35 | $LiCoO_2$ | Si | Liquid | PE | 20 | — | — |
| COMPARISON 5 | 4.35 | $LiCoO_2$ | SnCo | Liquid | PE | 20 | — | — |
| COMPARISON 6 | 4.2 | $LiCoO_2$ | GRAPHITE | Liquid | PE | 20 | — | — |
| COMPARISON 7 | 4.25 | $LiCoO_2$ | GRAPHITE | Liquid | PE | 20 | — | — |
| COMPARISON 8 | 4.25 | $LiCoO_2$ | Li | Liquid | PE | 20 | — | — |
| COMPARISON 9 | 4.25 | $LiCoO_2$ | Si | Liquid | PE | 20 | — | — |
| COMPARISON 10 | 4.25 | $LiCoO_2$ | SnCo | Liquid | PE | 20 | — | — |

|  | RESIN LAYER | | | PROCESS | |
|---|---|---|---|---|---|
|  | THICKNESS (μm) | MATERIAL | MOLECULAR WEIGHT | COATING METHOD | POROUS LAYER FORMING METHOD |
| EXAMPLE 1 | 4 | PVDF | 150000 | DIE COATER | PHASE SEPARATION |
| EXAMPLE 2 | 4 | PVDF | 150000 | DIE COATER | PHASE SEPARATION |
| EXAMPLE 3 | 4 | PVDF | 150000 | DIE COATER | PHASE SEPARATION |
| EXAMPLE 4 | 4 | PVDF | 150000 | DIE COATER | PHASE SEPARATION |
| EXAMPLE 5 | 4 | PVDF | 150000 | DIE COATER | PHASE SEPARATION |
| EXAMPLE 6 | 4 | PVDF | 150000 | DIE COATER | PHASE SEPARATION |
| EXAMPLE 7 | 4 | PVDF | 150000 | DIE COATER | PHASE SEPARATION |
| EXAMPLE 8 | 4 | PVDF | 150000 | DIE COATER | PHASE SEPARATION |
| EXAMPLE 9 | 4 | PVDF | 150000 | DIE COATER | PHASE SEPARATION |
| EXAMPLE 10 | 4 | PVDF | 150000 | DIE COATER | PHASE SEPARATION |

TABLE 1-continued

| | | | | | |
|---|---|---|---|---|---|
| EXAMPLE 11 | 4 | PVDF | 150000 | DIE COATER | PHASE SEPARATION |
| EXAMPLE 12 | 4 | PVDF | 150000 | DIE COATER | PHASE SEPARATION |
| EXAMPLE 13 | 4 | PVDF | 150000 | DIE COATER | PHASE SEPARATION |
| EXAMPLE 14 | 4 | PVDF | 150000 | DIE COATER | PHASE SEPARATION |
| EXAMPLE 15 | 4 | PVDF | 150000 | DIE COATER | PHASE SEPARATION |
| EXAMPLE 16 | 4 | PVDF | 150000 | DIE COATER | PHASE SEPARATION |
| EXAMPLE 17 | 4 | PVDF | 150000 | DIE COATER | PHASE SEPARATION |
| EXAMPLE 18 | 4 | PVDF | 150000 | DIE COATER | PHASE SEPARATION |
| EXAMPLE 19 | 4 | PVDF | 150000 | DIE COATER | PHASE SEPARATION |
| EXAMPLE 20 | 4 | PVDF | 150000 | DIE COATER | PHASE SEPARATION |
| EXAMPLE 21 | 4 | PVDF | 150000 | DIE COATER | PHASE SEPARATION |
| EXAMPLE 22 | 4 | PVDF | 150000 | DIE COATER | PHASE SEPARATION |
| EXAMPLE 23 | 4 | PVDF | 150000 | DIE COATER | PHASE SEPARATION |
| EXAMPLE 24 | 4 | PVDF | 150000 | DIE COATER | PHASE SEPARATION |
| EXAMPLE 25 | 4 | PVDF | 150000 | DIE COATER | PHASE SEPARATION |
| EXAMPLE 26 | 4 | PVDF | 150000 | DIE COATER | PHASE SEPARATION |
| EXAMPLE 27 | 4 | PTFE | 150000 | DIE COATER | PHASE SEPARATION |
| EXAMPLE 28 | 4 | ※1 PVDF-HFP | 150000 | DIE COATER | PHASE SEPARATION |
| EXAMPLE 29 | 4 | ※2 PVDF-HFP-PTFE | 150000 | DIE COATER | PHASE SEPARATION |
| EXAMPLE 30 | 4 | PVDF | 50000 | DIE COATER | PHASE SEPARATION |
| EXAMPLE 31 | 4 | PVDF | 300000 | DIE COATER | PHASE SEPARATION |
| EXAMPLE 32 | 4 | PVDF | 1000000 | DIE COATER | PHASE SEPARATION |
| EXAMPLE 33 | 4 | PVDF | 150000 | DIE COATER | PHASE SEPARATION |
| EXAMPLE 34 | 4 | PVDF | 150000 | DIE COATER | PHASE SEPARATION |
| EXAMPLE 35 | 4 | PVDF | 150000 | DIE COATER | PHASE SEPARATION |
| EXAMPLE 36 | 1 | PVDF | 150000 | DIE COATER | PHASE SEPARATION |
| EXAMPLE 37 | 10 | PVDF | 150000 | DIE COATER | PHASE SEPARATION |
| COMPARISON 1 | — | — | — | — | — |
| COMPARISON 2 | — | — | — | — | — |
| COMPARISON 3 | — | — | — | — | — |
| COMPARISON 4 | — | — | — | — | — |
| COMPARISON 5 | — | — | — | — | — |
| COMPARISON 6 | — | — | — | — | — |
| COMPARISON 7 | — | — | — | — | — |
| COMPARISON 8 | — | — | — | — | — |
| COMPARISON 9 | — | — | — | — | — |
| COMPARISON 10 | — | — | — | — | — |

| | SOLVENT 1 MATERIAL | SOLVENT 2 MATERIAL | AIR PERMEABILITY (sec/100 cc) | PIERCING STRENGTH (gf) | CAPACITANCE (mAh) | FLOATING LIMIT TIME (hr) |
|---|---|---|---|---|---|---|
| EXAMPLE 1 | NMP | $H_2O$ | 550 | 400 | 2500 | >1000 |
| EXAMPLE 2 | NMP | $H_2O$ | 550 | 400 | 2555 | >1000 |
| EXAMPLE 3 | NMP | $H_2O$ | 550 | 400 | 2600 | >1000 |
| EXAMPLE 4 | NMP | $H_2O$ | 550 | 400 | 2665 | 750 |
| EXAMPLE 5 | NMP | $H_2O$ | 550 | 400 | 2725 | 700 |
| EXAMPLE 6 | NMP | $H_2O$ | 550 | 400 | 2785 | 650 |
| EXAMPLE 7 | NMP | $H_2O$ | 550 | 400 | 2850 | 600 |
| EXAMPLE 8 | NMP | $H_2O$ | 550 | 400 | 2860 | 550 |
| EXAMPLE 9 | NMP | $H_2O$ | 550 | 400 | 2875 | 500 |
| EXAMPLE 10 | NMP | $H_2O$ | 620 | 405 | 2664 | 950 |
| EXAMPLE 11 | NMP | $H_2O$ | 600 | 403 | 2660 | 920 |
| EXAMPLE 12 | NMP | $H_2O$ | 580 | 398 | 2660 | 900 |
| EXAMPLE 13 | NMP | $H_2O$ | 555 | 412 | 2659 | 800 |
| EXAMPLE 14 | NMP | $H_2O$ | 540 | 396 | 2649 | 700 |
| EXAMPLE 15 | NMP | $H_2O$ | 540 | 397 | 2650 | 850 |
| EXAMPLE 16 | NMP | $H_2O$ | 550 | 407 | 2653 | 840 |
| EXAMPLE 17 | NMP | $H_2O$ | 535 | 405 | 2644 | 855 |
| EXAMPLE 18 | NMP | $H_2O$ | 545 | 389 | 2668 | 840 |
| EXAMPLE 19 | NMP | $H_2O$ | 550 | 400 | 3544 | 730 |
| EXAMPLE 20 | NMP | $H_2O$ | 550 | 400 | 3582 | 605 |
| EXAMPLE 21 | NMP | $H_2O$ | 550 | 400 | 3038 | 700 |
| EXAMPLE 22 | NMP | $H_2O$ | 290 | 200 | 2932 | 720 |
| EXAMPLE 23 | NMP | $H_2O$ | 320 | 210 | 2905 | 735 |
| EXAMPLE 24 | NMP | $H_2O$ | 360 | 250 | 2852 | 738 |
| EXAMPLE 25 | NMP | $H_2O$ | 600 | 480 | 2612 | 750 |
| EXAMPLE 26 | NMP | $H_2O$ | 365 | 350 | 2659 | >1000 |
| EXAMPLE 27 | NMP | $H_2O$ | 530 | 408 | 2654 | 805 |
| EXAMPLE 28 | NMP | $H_2O$ | 570 | 410 | 2651 | 890 |
| EXAMPLE 29 | NMP | $H_2O$ | 560 | 405 | 2668 | 800 |
| EXAMPLE 30 | NMP | $H_2O$ | 680 | 408 | 2661 | 770 |
| EXAMPLE 31 | NMP | $H_2O$ | 540 | 409 | 2668 | 760 |
| EXAMPLE 32 | NMP | $H_2O$ | 520 | 415 | 2686 | 753 |
| EXAMPLE 33 | NMP | $H_2O$ | 550 | 400 | 2677 | 760 |
| EXAMPLE 34 | NMP | $H_2O$ | 550 | 400 | 2239 | 600 |
| EXAMPLE 35 | NMP | $H_2O$ | 550 | 400 | 2745 | 700 |
| EXAMPLE 36 | NMP | $H_2O$ | 502 | 402 | 2638 | 510 |
| EXAMPLE 37 | NMP | $H_2O$ | 620 | 410 | 2558 | 802 |

TABLE 1-continued

| | | | | | | |
|---|---|---|---|---|---|---|
| COMPARISON 1 | — | — | DIFFICULT TO BE MEASURED | — | — | — |
| COMPARISON 2 | — | — | 575 | 490 | 2660 | 150 |
| COMPARISON 3 | — | — | 575 | 490 | 3550 | 150 |
| COMPARISON 4 | — | — | 575 | 490 | 3574 | 100 |
| COMPARISON 5 | — | — | 575 | 490 | 3050 | 100 |
| COMPARISON 6 | — | — | 575 | 490 | 2500 | 400 |
| COMPARISON 7 | — | — | 575 | 490 | 2557 | 205 |
| COMPARISON 8 | — | — | 575 | 490 | 2560 | 110 |
| COMPARISON 9 | — | — | 575 | 490 | 2554 | 95 |
| COMPARISON 10 | — | — | 575 | 490 | 2561 | 104 |

※1 PVDF-HFP is a copolymer of PVDF and HFP.
※2 PVDF-HFP-PTFE is a copolymer of PVDF, HFP, and PTFE.

Table 1 shows Example 1 to Example 37 and Comparison 1 to Comparison 10. Examples 1 to 37 and Comparisons 1 to 10 will be described hereinbelow with reference to Table 1.

The cathode is formed as follows. Lithium cobalt acid ($LiCoO_2$) of 98 wt % as a cathode active material, amorphous carbon powder (ketjen black) of 0.8 wt %, and polyvinylidene fluoride (PVdF) of 1.2 wt % are mixed and a cathode mixture is adjusted and formed. By dispersing the cathode mixture into N-methyl-2-pyrolidone (NMP), a cathode mixture slurry is formed. After that, both surfaces of the cathode collector made of a belt-shaped aluminum foil are uniformly coated with the cathode mixture slurry. The obtained coating collector is dried with a hot air and, thereafter, compression-molded by a roll pressing machine, and the cathode mixture layer is manufactured.

The anode is manufactured as follows. By mixing graphite powder of 90 wt % and PVdF of 10 wt %, an anode mixture is adjusted and formed. By dispersing the anode mixture into N-methyl-2-pyrolidone, an anode mixture slurry is formed. After that, both surfaces of the anode collector made of a belt-shaped copper foil are uniformly coated with the anode mixture slurry. Further, the obtained collector is pressed and molded with a heat, so that an anode mixture layer is formed.

The separator is manufactured as follows. First, N-methyl-2-pyrolidone is added to a polyvinylidene fluoride resin (average molecular weight is equal to 150000) at a mass ratio of (10:90) and sufficiently melted and a 10 wt % N-methyl-2-pyrolidone solution of PVdF is manufactured.

Subsequently, $Al_2O_3$ (alumina) micropowder whose average particle size is equal to 250 nm is added as an inorganic substance into the above solution so that its amount is twice as large as that of PVdF and sufficiently stirred, and a coating slurry is manufactured. Then, the surface of a microporous membrane made of polyethylene having a thickness of 16 μm and serving as a base material layer is coated with the manufactured slurry by a desktop coater. Subsequently, it is phase-separated in a water bath, thereafter, dried with a hot air, and a microporous membrane having a PVdF microporous layer having a thickness of 4 μm and holding alumina is obtained.

With respect to the separator manufactured here, an air permeability and a piercing strength, which will be explained hereinbelow, are measured.

Measurement of Air Permeability

The air permeability is measured by using Gurley type densometer (made by Toyo Seiki Co., Ltd.) on the basis of JIS P8117.

Measurement of Piercing Strength

A maximum load obtained when a needle in which a diameter φ of a front tip is equal to 1.0 mm has been stuck at a speed of 2 mm/sec by using a Handy compression tester (KES-G5 made by Kato Tech Co., Ltd.) is assumed to be a piercing strength.

As a result of the above measurement, the air permeability (JIS P8117) of the separator of Example 1 is equal to 550 sec/100 cc. The piercing strength is equal to 4.00 gf. The separator having excellent ion permeability is obtained.

Subsequently, the separator, cathode, and anode are laminated in order of the anode, separator, cathode, and separator and the laminate is wound a number of times into a spiral shape, so that a jelly-roll type winded electrode member is manufactured.

After the winded electrode member was manufactured, a pair of insulating plates are arranged perpendicularly to the circumferential surface of the winded electrode member so as to sandwich the winded electrode member. To perform the collection of the cathode, one end of the cathode lead made of aluminum is led out of the cathode collector and the other end is electrically connected to a battery cap through a disk plate. To perform the collection of the anode, one end of the anode lead made of nickel is led out of the anode collector and the other end is welded to the battery can. The winded electrode member is enclosed in the battery can and an electrolytic solution is poured into the battery can by a pressure reducing system.

A mixture solvent obtained by mixing ethylene carbonate of 35 wt %, dimethyl carbonate of 63 wt %, and vinylene carbonate of 2 wt % is adjusted and formed for the electrolytic solution. Further, a solution obtained by dissolving $LiPF_6$ into the mixture solvent so that its weight mole concentration is equal to 1.5 mol/kg is used. Finally, by caulking the battery can through a gasket coated with asphalt, it is sealed in the state where the relief valve mechanism, PTC element, and battery cap have been piled. In this manner, the cylindrical non-aqueous electrolytic solution secondary battery of Example 1 is manufactured.

With respect to the secondary battery of Example 1, a floating test, which are explained below, is performed.

Floating Test

The battery is charged so that an open circuit voltage in the fully charged state is equal to 4.2 V or more and a fluctuation in charge current value in a high-temperature overcharging state is examined. The charge current value fluctuation is called "floating characteristics" hereinbelow. The floating characteristics are measured in a high-temperature bath maintained at 60° C. by a constant current—constant voltage system of 1000 h. Specifically speaking, after the constant current charge was started at 500 mA, when a voltage across terminals rises to a predetermined voltage, it is switched to the constant voltage charge. A time which is necessary until a leading edge of the current after the constant voltage charge is measured and assumed to be the floating limit time.

In Example 1, the battery is charged so that the open circuit voltage in the fully charged state is equal to 4.2V, and a floating test is executed. After the battery is charged so that the open circuit voltage in the fully charged state is equal to 4.2V, the discharge is executed by the constant current of 540 mA (0.2 C) until the voltage is equal to 3.0V, and a capacitance is measured.

As shown in Table 1, in Example 1, the floating limit time exceeds 1000 hours and good floating characteristics are shown. The capacitance upon full charging is equal to 2500 mAh.

Example 2 to Example 9

Example 2

A secondary battery of Example 2 is manufactured in a manner similar to Example 1. The battery is charged so that the open circuit voltage in the fully charged state is equal to 4.25V. Subsequently, the capacitance is measured and the floating test is executed.

Example 3

A secondary battery of Example 3 is manufactured in a manner similar to Example 1. The battery is charged so that the open circuit voltage in the fully charged state is equal to 4.30V. Subsequently, the capacitance is measured and the floating test is executed.

Example 4

A secondary battery of Example 4 is manufactured in a manner similar to Example 1. The battery is charged so that the open circuit voltage in the fully charged state is equal to 4.35V. Subsequently, the capacitance is measured and the floating test is executed.

Example 5

A secondary battery of Example 5 is manufactured in a manner similar to Example 1. The battery is charged so that the open circuit voltage in the fully charged state is equal to 4.40V. Subsequently, the capacitance is measured and the floating test is executed.

Example 6

A secondary battery of Example 6 is manufactured in a manner similar to Example 1. The battery is charged so that the open circuit voltage in the fully charged state is equal to 4.45V. Subsequently, the capacitance is measured and the floating test is executed.

Example 7

A secondary battery of Example 7 is manufactured in a manner similar to Example 1. The battery is charged so that the open circuit voltage in the fully charged state is equal to 4.50V. Subsequently, the capacitance is measured and the floating test is executed.

Example 8

A secondary battery of Example 8 is manufactured in a manner similar to Example 1. The battery is charged so that the open circuit voltage in the fully charged state is equal to 4.55V. Subsequently, the capacitance is measured and the floating test is executed.

Example 9

A secondary battery of Example 9 is manufactured in a manner similar to Example 1. The battery is charged so that the open circuit voltage in the fully charged state is equal to 4.60V. Subsequently, the capacitance is measured and the floating test is executed.

As shown in Table 1, in Examples 2 to 9, the good floating characteristics are shown.

Example 10 to Example 14

Example 10

A secondary battery of Example 10 is manufactured in a manner similar to Example 1 except that alumina micropowder whose average particle size is equal to 7 nm is used as an inorganic substance. The battery is charged so that the open circuit voltage in the fully charged state is equal to 4.35V. Subsequently, the capacitance is measured and the floating test is executed.

Example 11

A secondary battery of Example 11 is manufactured in a manner similar to Example 1 except that alumina micropowder whose average particle size is equal to 16 nm is used as an inorganic substance. The battery is charged so that the open circuit voltage in the fully charged state is equal to 4.35V. Subsequently, the capacitance is measured and the floating test is executed.

Example 12

A secondary battery of Example 12 is manufactured in a manner similar to Example 1 except that alumina micropowder whose average particle size is equal to 40 nm is used as an inorganic substance. The battery is charged so that the open circuit voltage in the fully charged state is equal to 4.35V. Subsequently, the capacitance is measured and the floating test is executed.

Example 13

A secondary battery of Example 13 is manufactured in a manner similar to Example 1 except that alumina micropowder whose average particle size is equal to 140 mn is used as an inorganic substance. The battery is charged so that the open circuit voltage in the fully charged state is equal to 4.35V. Subsequently, the capacitance is measured and the floating test is executed.

Example 14

A secondary battery of Example 14 is manufactured in a manner similar to Example 1 except that alumina micropowder whose average particle size is equal to 380 nm is used as an inorganic substance. The battery is charged so that the open circuit voltage in the fully charged state is equal to 4.35V. Subsequently, the capacitance is measured and the floating test is executed.

As shown in Table 1, in Examples 10 to 14, the good floating characteristics are shown.

Example 15 to Example 18

Example 15

A secondary battery of Example 15 is manufactured in a manner similar to Example 1 except that boron nitride (BN) whose average particle size is equal to 140 nm is used as an inorganic substance. The battery is charged so that the open circuit voltage in the fully charged state is equal to 4.35V. Subsequently, the capacitance is measured and the floating test is executed.

Example 16

A secondary battery of Example 16 is manufactured in a manner similar to Example 1 except that aluminum nitride (AlN) whose average particle size is equal to 140 mn is used as an inorganic substance. The battery is charged so that the open circuit voltage in the fully charged state is equal to 4.35V. Subsequently, the capacitance is measured and the floating test is executed.

Example 17

A secondary battery of Example 17 is manufactured in a manner similar to Example 1 except that titanium dioxide ($TiO_2$) whose average particle size is equal to 140 nm is used as an inorganic substance. The battery is charged so that the open circuit voltage in the fully charged state is equal to 4.35V. Subsequently, the capacitance is measured and the floating test is executed.

Example 18

A secondary battery of Example 18 is manufactured in a manner similar to Example 1 except that silicon dioxide ($SiO_2$) whose average particle size is equal to 140 nm is used as an inorganic substance. The battery is charged so that the open circuit voltage in the fully charged state is equal to 4.35V. Subsequently, the capacitance is measured and the floating test is executed.

As shown in Table 1, in Examples 15 to 18, the good floating characteristics are shown.

Example 19 to Example 21

Example 19

A secondary battery of Example 19 is manufactured in a manner similar to Example 1 except that lithium (Li) is used for the anode. The battery is charged so that the open circuit voltage in the fully charged state is equal to 4.35V. Subsequently, the capacitance is measured and the floating test is executed.

Example 20

A secondary battery of Example 20 is manufactured in a manner similar to Example 1 except that silicon (Si) is used for the anode. The battery is charged so that the open circuit voltage in the fully charged state is equal to 4.35V. Subsequently, the capacitance is measured and the floating test is executed.

Example 21

A secondary battery of Example 21 is manufactured in a manner similar to Example 1 except that a tin-cobalt alloy (Sn—Co) is used for the anode. The battery is charged so that the open circuit voltage in the fully charged state is equal to 4.35V. Subsequently, the capacitance is measured and the floating test is executed.

As shown in Table 1, in Examples 19 to 21, the good floating characteristics are shown.

Example 22 to Example 25

Example 22

A secondary battery of Example 22 is manufactured in a manner similar to Example 1 except that the thickness of PE microporous membrane as a base material layer is set to 5 μm. The battery is charged so that the open circuit voltage in the fully charged state is equal to 4.35V. Subsequently, the capacitance is measured and the floating test is executed.

Example 23

A secondary battery of Example 23 is manufactured in a manner similar to Example 1 except that the thickness of PE microporous membrane as a base material layer is set to 7 μm. The battery is charged so that the open circuit voltage in the fully charged state is equal to 4.35V. Subsequently, the capacitance is measured and the floating test is executed.

Example 24

A secondary battery of Example 24 is manufactured in a manner similar to Example 1 except that the thickness of PE microporous membrane as a base material layer is set to 9 μm. The battery is charged so that the open circuit voltage in the fully charged state is equal to 4.35V. Subsequently, the capacitance is measured and the floating test is executed.

Example 25

A secondary battery of Example 25 is manufactured in a manner similar to Example 1 except that the thickness of PE microporous membrane as a base material layer is set to 20 μm. The battery is charged so that the open circuit voltage in the fully charged state is equal to 4.35V. Subsequently, the capacitance is measured and the floating test is executed.

As shown in Table 1, in Examples 22 to 25, the good floating characteristics are shown.

Example 26

A secondary battery of Example 26 is manufactured in a manner similar to Example 1 except that a triple-layer microporous membrane having surface layer polypropylene (PP) having a thickness of 16 μm, an inner layer PE, and a surface layer PP is used in place of the PE microporous membrane as a base material layer. The battery is charged so that the open circuit voltage in the fully charged state is equal to 4.35V. Subsequently, the capacitance is measured and the floating test is executed.

As shown in Table 1, in Example 26, the good floating characteristics are shown.

Example 27 to Example 29

Example 27

A secondary battery of Example 27 is manufactured in a manner similar to Example 1 except that polytetrafluoro ethylene (PTFE) is used as a matrix resin. The battery is charged so that the open circuit voltage in the fully charged state is equal to 4.35V. Subsequently, the capacitance is measured and the floating test is executed.

Example 28

A secondary battery of Example 28 is manufactured in a manner similar to Example 1 except that a polyvinylidene fluoride-hexafluoro propylene (PVdF-HFP) copolymer is used as a matrix resin. The battery is charged so that the open circuit voltage in the fully charged state is equal to 4.35V. Subsequently, the capacitance is measured and the floating test is executed.

Example 29

A secondary battery of Example 29 is manufactured in a manner similar to Example 1 except that a polyvinylidene fluoride-hexafluoro propylene-polytetrafluoro ethylene (PVdF-HFP-PTFE) copolymer is used as a matrix resin. The battery is charged so that the open circuit voltage in the fully charged state is equal to 4.35V. Subsequently, the capacitance is measured and the floating test is executed.

As shown in Table 1, in Examples 27 to 29, the good floating characteristics are shown.

Example 30 to Example 32

Example 30

A secondary battery of Example 30 is manufactured in a manner similar to Example 1 except that PVdF whose average molecular weight is equal to 50,000 is used. The battery is charged so that the open circuit voltage in the fully charged state is equal to 4.35V. Subsequently, the capacitance is measured and the floating test is executed.

Example 31

A secondary battery of Example 31 is manufactured in a manner similar to Example 1 except that PVdF whose average molecular weight is equal to 300,000 is used. The battery is charged so that the open circuit voltage in the fully charged state is equal to 4.35V. Subsequently, the capacitance is measured and the floating test is executed.

Example 32

A secondary battery of Example 32 is manufactured in a manner similar to Example 1 except that PVdF whose average molecular weight is equal to 1,000,000 is used. The battery is charged so that the open circuit voltage in the fully charged state is equal to 4.35V. Subsequently, the capacitance is measured and the floating test is executed.

As shown in Table 1, in Examples 30 to 32, the good floating characteristics are shown.

Example 33 to Example 35

Example 33

A secondary battery of Example 33 is manufactured in a manner similar to Example 1 except that $LiCoO_2/LiNiCoMnO_2=8/2$ (mass ratio) is used for the cathode. The battery is charged so that the open circuit voltage in the fully charged state is equal to 4.35V. Subsequently, the capacitance is measured and the floating test is executed.

Example 34

A secondary battery of Example 34 is manufactured in a manner similar to Example 1 except that $LiNiMnO_4$ is used for the cathode. The battery is charged so that the open circuit voltage in the fully charged state is equal to 4.35V. Subsequently, the capacitance is measured and the floating test is executed.

Example 35

A secondary battery of Example 35 is manufactured in a manner similar to Example 1 except that lithium cobalt phosphate ($LiCoPO_4$) is used for the cathode. The battery is charged so that the open circuit voltage in the fully charged state is equal to 4.35V. Subsequently, the capacitance is measured and the floating test is executed.

As shown in Table 1, in Examples 33 to 35, the good floating characteristics are shown.

Example 36 to Example 37

Example 36

A secondary battery of Example 36 is manufactured in a manner similar to Example 1 except that a thickness of resin layer is set to 1 μm. The battery is charged so that the open circuit voltage in the fully charged state is equal to 4.35V. Subsequently, the capacitance is measured and the floating test is executed.

Example 37

A secondary battery of Example 37 is manufactured in a manner similar to Example 1 except that a thickness of resin layer is set to 10 μm. The battery is charged so that the open circuit voltage in the fully charged state is equal to 4.35V. Subsequently, the capacitance is measured and the floating test is executed.

As shown in Table 1, in Examples 36 and 37, the smaller the thickness of resin layer is, the shorter the floating time is. However, good floating characteristics are shown.

Comparison 1

By a desktop coater, the surface of a microporous membrane made of PE having a thickness of 16 μm is coated with the slurry manufactured in a manner similar to Example 1, it is not phase-separated in a water bath but dried with a hot air, and the PE microporous membrane having the PVdF layer holding alumina is manufactured.

In Comparison 1, although a thickness of separator is equal to 20 μm, the PVdF layer does not have the porosity, there is no penetration of the air, and it is difficult to measure the air permeability. That is, the non-microporous membrane which is poor in an impregnating ability of the electrolytic solution and which does not have the ion permeability is obtained and does not function as a battery.

Comparison 2

A secondary battery of Comparison 2 is manufactured in a manner similar to Example 1 except that the slurry of Example 1 is not coated but the PE microporous membrane having a thickness of 20 μm is used. The battery is charged so that the open circuit voltage in the fully charged state is equal to 4.35V. Subsequently, the capacitance is measured and the floating test is executed.

As shown in Table 1, it has been found that the leading of the current is seen after the elapse of 150 hours and a micro short-circuit occurred.

Comparison 3 to Comparison 5

Comparison 3

A secondary battery of Comparison 3 is manufactured in a manner similar to Comparison 2 except that lithium (Li) is used for the anode. The battery is charged so that the open circuit voltage in the fully charged state is equal to 4.35V. Subsequently, the capacitance is measured and the floating test is executed.

Comparison 4

A secondary battery of Comparison 4 is manufactured in a manner similar to Comparison 2 except that silicon (Si) is used for the anode. The battery is charged so that the open circuit voltage in the fully charged state is equal to 4.35V. Subsequently, the capacitance is measured and the floating test is executed.

Comparison 5

A secondary battery of Comparison 5 is manufactured in a manner similar to Comparison 2 except that a tin-cobalt alloy (Sn—Co) is used for the anode. The battery is charged so that the open circuit voltage in the fully charged state is equal to 4.35V. Subsequently, the capacitance is measured and the floating test is executed.

As shown in Table 1, it has been found in Comparison 3 that the leading of the current is seen after the elapse of 150 hours and the micro short-circuit occurred. It has been found in Comparison 4 that the leading of the current is seen after the elapse of 100 hours and the micro short-circuit occurred. It has been found in Comparison 5 that the leading of the current is seen after the elapse of 100 hours and the micro short-circuit occurred.

Comparison 6

A secondary battery of Comparison 6 is manufactured in a manner similar to Comparison 2. The battery is charged so that the open circuit voltage in the fully charged state is equal to 4.20V. Subsequently, the capacitance is measured and the floating test is executed.

As shown in Table 1, it has been found in Comparison 6 that the leading of the current is seen after the elapse of 400 hours and the micro short-circuit occurred.

Comparison 7

A secondary battery of Comparison 7 is manufactured in a manner similar to Comparison 2. The battery is charged so that the open circuit voltage in the fully charged state is equal to 4.25V. Subsequently, the capacitance is measured and the floating test is executed.

It has been found in Comparison 7 that the leading of the current is seen after the elapse of 400 hours and the micro short-circuit occurred.

Comparison 8 to Comparison 10

Comparison 8

A secondary battery of Comparison 8 is manufactured in a manner similar to Comparison 3. The battery is charged so that the open circuit voltage in the fully charged state is equal to 4.25V. Subsequently, the capacitance is measured and the floating test is executed.

Comparison 9

A secondary battery of Comparison 9 is manufactured in a manner similar to Comparison 4. The battery is charged so that the open circuit voltage in the fully charged state is equal to 4.25V. Subsequently, the capacitance is measured and the floating test is executed.

Comparison 10

A secondary battery of Comparison 10 is manufactured in a manner similar to Comparison 5. The battery is charged so that the open circuit voltage in the fully charged state is equal to 4.25V. Subsequently, the capacitance is measured and the floating test is executed.

As shown in Table 1, it has been found in Comparison 8 that the leading of the current is seen after the elapse of 110 hours and the micro short-circuit occurred. It has been found in Comparison 9 that the leading of the current is seen after the elapse of 95 hours and the micro short-circuit occurred. It has been found in Comparison 10 that the leading of the current is seen after the elapse of 104 hours and the micro short-circuit occurred.

The embodiments are not limited to the foregoing examples and various modifications and applications are possible. For example, the shape of the battery is not particularly limited but may be a cylindrical shape, a rectangular shape, a coin type, a button type, or the like.

Although the first embodiment has been described with respect to the non-aqueous electrolyte battery having the electrolytic solution as an electrolyte and the second embodiment has been described with respect to the non-aqueous electrolyte battery having the gel electrolyte as an electrolyte, the embodiment is not limited to them.

For example, besides the electrolytes mentioned above, a high molecular solid electrolyte using ion conductive macro molecules, an inorganic solid electrolyte using an ion conductive inorganic material, or the like can be also used, or one of them can be solely used or a combination with another electrolyte may be used. As a high molecular compound which can be used for the high molecular solid electrolyte, for example, polyether, polyester, polyphosphazene, polysiloxane, or the like can be mentioned. As an inorganic solid electrolyte, for example, ion conductive ceramics, ion conductive crystal, ion conductive glass, or the like can be mentioned.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A non-aqueous electrolyte battery in which a cathode and an anode are arranged through a separator so as to face each other,
   wherein said separator includes a resin layer formed at least on one principal plane of a base material layer of the separator,
   wherein said base material layer of the separator is microporous,
   wherein a piercing strength of said separator ranges from 100 to 1000 gf, and
   wherein said resin layer includes an inorganic substance,
   wherein an open circuit voltage in a fully charged state per pair of said cathode and said anode ranges from 4.2 to 4.6 V.

2. The battery according to claim 1, wherein a particle size of said inorganic substance ranges from 1 nm to 10 μm.

3. The battery according to claim 1, wherein an air permeability of said separator ranges from 30 sec/100 cc to 1000 sec/100 cc.

4. The battery according to claim 1, wherein an open circuit voltage in a fully charged state per pair of said cathode and said anode ranges from 4:25 to 4.6 V.

5. The battery according to claim 1, wherein said base material layer of the separator includes a plurality of layers.

6. The battery according to claim 1, wherein said resin layer is microporous.

* * * * *